(12) United States Patent
Sato

(10) Patent No.: US 6,879,265 B2
(45) Date of Patent: Apr. 12, 2005

(54) FREQUENCY INTERPOLATING DEVICE FOR INTERPOLATING FREQUENCY COMPONENT OF SIGNAL AND FREQUENCY INTERPOLATING METHOD

(75) Inventor: Yasushi Sato, Nagareyama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 217 days.

(21) Appl. No.: 10/332,850
(22) PCT Filed: Jun. 27, 2001
(86) PCT No.: PCT/JP01/05521
§ 371 (c)(1),
(2), (4) Date: Jan. 14, 2003
(87) PCT Pub. No.: WO02/09092
PCT Pub. Date: Jan. 31, 2002

(65) Prior Publication Data
US 2004/0028125 A1 Feb. 12, 2004

(51) Int. Cl.[7] .............................................. H03M 7/00
(52) U.S. Cl. ........................................ 341/50; 708/290
(58) Field of Search .............. 341/50, 107; 375/240.21, 375/240, 355; 708/290; 704/205; 702/75, 76

(56) References Cited

U.S. PATENT DOCUMENTS 5,576,978 A * 11/1996 Kitayoshi ..................... 702/77
5,852,470 A * 12/1998 Kondo et al. ................ 348/448
6,456,657 B1 * 9/2002 Yeap et al. ............. 375/240.12

FOREIGN PATENT DOCUMENTS

| EP | 06-222799 | 8/1994 |
|---|---|---|
| JP | 02-235424 | 9/1990 |
| JP | 03-254223 | 11/1991 |
| JP | 06-085607 | 3/1994 |
| JP | 06-294830 | 10/1994 |
| JP | 09-090992 | 4/1997 |
| JP | 09-258787 | 10/1997 |
| JP | 10-097287 | 4/1998 |
| JP | 2000-36755 | 2/2000 |
| JP | 2001-83995 | 3/2001 |

OTHER PUBLICATIONS

International Search Report dated Jun. 27, 2001.

* cited by examiner

Primary Examiner—Michael Tokar
Assistant Examiner—John B Nguyen
(74) Attorney, Agent, or Firm—Eric J. Robinson; Robinson Intellectual Property Law Office, P.C.

(57) ABSTRACT

A frequency interpolating device for restoring an audio signal compressed at high ratio while keeping the high sound quality. An input digital signal to be subjected to frequency interpolation is converted to a spectrum signal representing the spectrum of the time-series signal by an analyzer. A spectrum analyzing section specifies, as an interpolating band, a deletion band not containing any spectrum among the bands defined by dividing the spectrum of the signal. A frequency interpolating section deduces the envelope of a digital signal and scales the spectrum of the spectrum distribution in the interpolating band specified by the spectrum analyzing section so that the spectrum matches with the function of the envelope and performs addition. The past spectra used for the scaling and addition are read out of a spectrum storage section. A synthesizer converts back the signal having the spectrum after the addition to the time-series signal. Thus, an audio signal compressed at high ratio by thinning of frequency components can be restored while keeping the high quality.

8 Claims, 10 Drawing Sheets

FREQUENCY INTERPOLATING DEVICE FOR INTERPOLATING FREQUENCY COMPONENT OF SIGNAL AND FREQUENCY INTERPOLATING METHOD

RELATED APPLICATION

This application is a continuation application of PCT/JP01/05521, filed Jun. 27, 2001, the contents of which are incorporated by reference, in their entirety.

TECHNICAL FIELD

The present invention relates to a frequency interpolating device and method for improving the spectrum distribution of a signal compressed by removing (thinning) the frequency components in a specific frequency band from an original signal.

Distribution of music and the like by wired or wireless broadcasting or communications is prevailing recent years. In order to avoid an increase in data amount and a spread of occupied band width because of the use of an excessively broad band in distributing music or the like by broadcasting or communications, music data is generally distributed in an audio signal compression type such as MP3 (MPEG1 audio layer 3) type and AAC (Advanced Audio Coding) type.

These audio signal compression types utilize the phenomenon that spectrum components at a low level of an audio signal having frequencies near those of spectrum components at a high level are difficult to be heard with human ears.

As the traffics of broadcasting or communications increase, it becomes necessary to narrow an occupied band width and reduce a line capacity used by broadcasting or communications, in this case, if the above-described audio signal compression type is simply used, the data distribution time is elongated or cannot be performed smoothly. To solve this problem, techniques of compressing data at a high ratio and techniques of restoring the data compressed at a high ratio while the data quality is maintained high.

The invention has been made under such circumstances. It is an object of the invention to provide a frequency interpolating device and method for restoring an audio signal or the like compressed at a high ratio by removing the frequency components in a specific frequency band, while the quality of the signal is maintained high.

DISCLOSURE OF THE INVENTION

In order to achieve the above object, the invention provides a frequency interpolating device for restoring an approximate original signal from a signal having information compressed by removing frequency components of an original signal in a particular frequency band and in a particular period, wherein a removal band in a certain signal period of the signal having the compressed information from which removal band the particular frequency components were removed is inserted with frequency components left in a frequency band same as the removal band and in a signal period different from the certain signal period of the signal having the compressed information to thereby interpolate the frequency components of the removal band. The different signal period is typically a signal period adjacent to the certain signal period, and is preferably a signal period immediately before the certain signal period. More specifically, a frequency interpolating device of the invention, comprises: means for generating spectrum signals representative of spectra in first and second periods of an input signal to be interpolated; means for generating envelope information representative of the spectrum during the first period in accordance with the spectrum signal; means for distinguishing a spectrum removal band in the first period in which a spectrum does not substantially exist, in accordance with the spectrum signal; means for identifying a spectrum pattern in a frequency band substantially the same as the spectrum removal band in the second period, in accordance with the spectrum signal; and means for adding to the input signal a signal having the spectrum pattern in the frequency band substantially the same as the spectrum removal band in the second period and having a spectrum intensity equal to an intensity estimated by an envelope represented by the envelope information in the removal band.

According to the frequency interpolating device constructed as above, the spectrum in the same band (as the removal band) in the second period is added to the removal period in the first period to interpolate the spectrum removed in the first period. Accordingly, the signal after interpolation is approximately the original signal. If an input signal is an audio signal, an audio signal having a high sound quality can be recovered even if the input signal is an audio signal highly compressed.

The input signal is a digital signal (such as a PCM signal) obtained by sampling and quantizing an analog signal.

EMBODIMENTS OF THE INVENTION

A frequency interpolating device according to an embodiment of the invention will be described with reference to the accompanying drawings, by taking an audio signal processing apparatus as an example.

Figure 1:
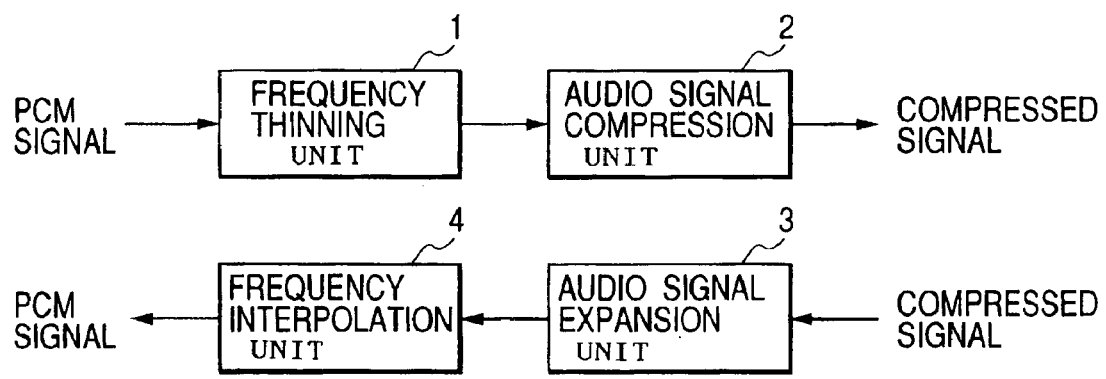
FIG. 1 is a diagram showing the structure of an audio signal processing apparatus according to an embodiment of the invention.

FIG. 1 is a diagram showing the structure of an audio signal processing apparatus according to an embodiment of the invention.

As shown, the audio signal processing apparatus is constituted of a frequency thinning unit 1, an audio signal compressing unit 2, an audio signal expanding unit 3 and a frequency interpolating unit 4.

Figure 2:
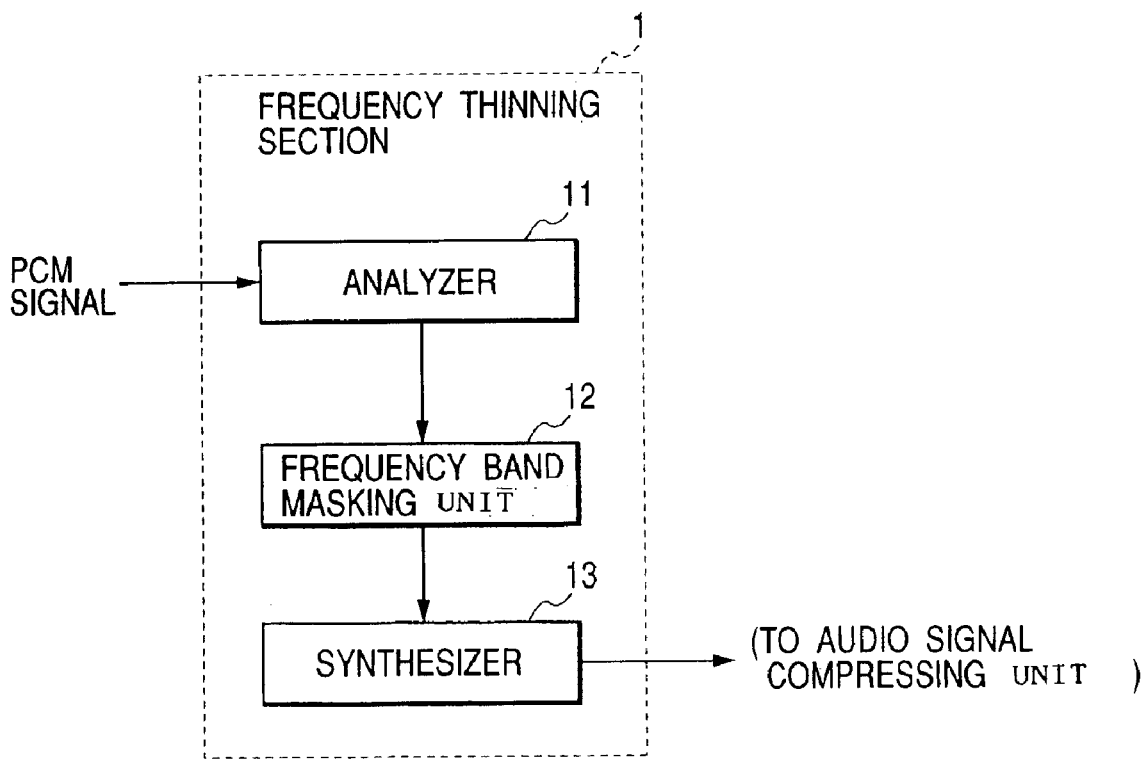
FIG. 2 is a diagram showing the structure of a frequency thinning unit.

As shown in FIG. 2, the frequency thinning unit 1 is constituted of an analyzer 11, a frequency band masking unit 12 and a synthesizer 13.

Figure 3:
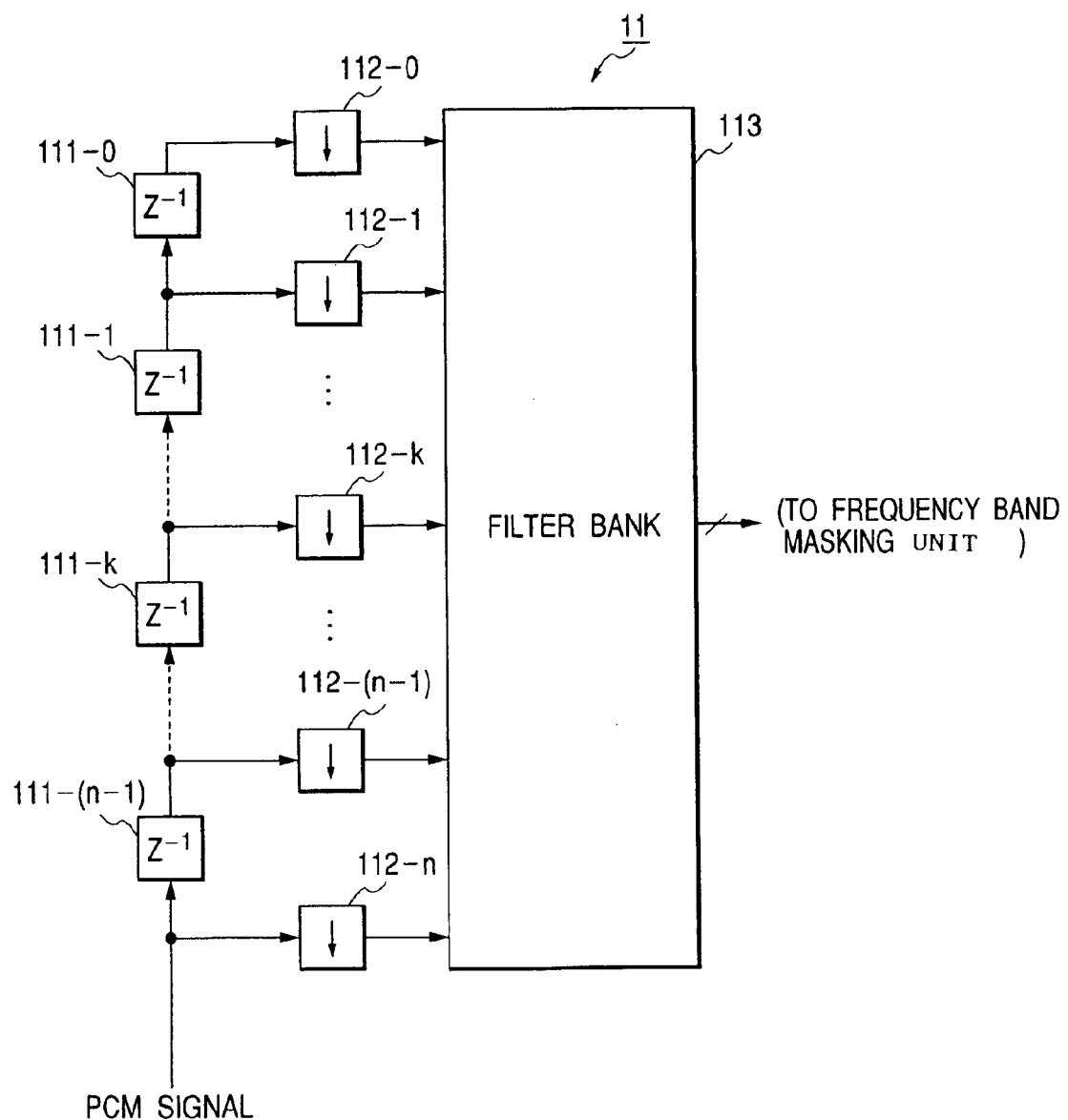
FIG. 3 is a diagram showing the structure of an analyzer.

As shown in FIG. 3, the analyzer 11 is constituted of n delay units 111-0 to 111-(n−1), (n+1) samplers 112-0 to 112-n and a filter bank 113 (where n is an optional integer of 1 or larger).

Each of the delay units 111-0 to 111-(n−1) delays an input signal by one period of the signal and outputs it.

A signal output from the delay unit 111-k (k is an optional integer not smaller than 0 and not larger than (n−1)) is supplied to the sampler 112-k. The delay unit 111-j (j is an optional integer not smaller than 0 and not larger than (n−2)) is supplied with an output of the delay unit 111-(j+1). The delay unit 111-(n−1) is supplied with a PCM (Pulse Code Modulation) signal to be frequency-thinned by the frequency thinning unit 1.

The delay unit 111-k delays the PCM signal supplied to the delay unit 111-(n−1) by (n−k) periods of the signal and outputs it. The PCM signal is obtained by sampling and quantizing an analog audio signal or the like expressed as a change in voltage or current.

Each of the samplers 112-0 to 112-n samples an input signal at one (n+1)-th of the frequency of a PCM signal to be frequency-thinned, and supplies a sampled signal to the filter bank 113.

The sampler 112-k is supplied with an output of the delay unit 111-k as described above. The sampler 112-n is supplied with the PCM signal to be subjected frequency interpolation by the frequency thinning unit 1 substantially at the same time when the PCM signal is supplied to the delay unit 111-(n−1).

The filter bank 113 is constituted of a DSP (Digital Signal Processor), a CPU (Central Processing Unit) and the like and receives output signals of the samplers 112-0 to 112-n as described above.

The filter bank 113 generates first to (n+1)-th (n+1) signals representative of spectrum distributions of input signals by means of a poly-phase filter, DCT (Discrete Cosine Transform), LOT (Lapped Orthogonal Transform), MLT (Modulated Lapped Transform), ELT (Extended Lapped Transform) or the like. These generated (n+1) signals are supplied to the frequency band masking unit 12.

It is assumed that the p-th signal (p is an integer of any one of 1 to (n+1)) generated by the filter bank 113 is a signal representative of a spectrum distribution of a band at the p-th lowest frequency among the bands having the same band width and obtained by equally dividing by (n+1) the spectrum distribution of the output signals of the samplers 112-0 to 112-n.

The frequency band masking unit 12 is constituted of a DSP, a CPU and the like. When the (n+1) signals representative of the spectrum distributions of the (n+1) bands are supplied from the analyzer 11 (more specifically the filter bank 113), for example, the frequency band masking unit 12 performs the following processes (1) to (6).

(1) In order to determine higher harmonic bands, first the frequency band masking unit 12 specifies two bands among the bands represented by the signals supplied from the filter bank 113, and calculates a mean square value of the spectrum components of each band. (The higher harmonic band is a band which contains higher-harmonic components of a PCM signal to be subjected to frequency thinning. In the following, a band which contains fundamental frequency components of a PCM signal to be subjected to frequency thinning is called a "fundamental frequency band").

(2) By using the mean square values of the spectrum components of the two bands (hereinafter called a "first band" and a "second band") specified in the process (1), normalization is performed for the values of the spectrum components of one of the two bands. Specifically, for example, a ratio is calculated between the mean square value of the spectrum of the first band and the mean square value of the spectrum of the second band, and the product of this ratio and each spectrum component value of the second band is calculated. A set of calculated products represents the normalized spectrum distribution of the second band.

(3) A correlation coefficient between the normalized spectrum distributions of the first and second bands is calculated by means of least square or the like.

In this case, the frequency band masking unit 12 calculates the correlation coefficient on the assumption that each frequency of the spectrum in the lower frequency band among the first and second bands is an original frequency added to an absolute value of a difference between the lowest frequencies of the two bands.

(4) The frequency band masking unit 12 calculates correlation coefficients by performing the processes (1) to (3) for all combinations of first and second bands. In accordance with the calculated correlation coefficients, the fundamental frequency band and higher harmonic hands are specified.

Specifically, for example, the frequency band masking unit 12 specifies as the fundamental frequency band the band that has a correlation coefficient equal to or lower than a predetermined value in any combination of bands having the lowest frequency lower than that of the band, among all the bands represented by the signals supplied from the filter bank 113. The bands other than the fundamental frequency band are specified as higher harmonic bands.

(5) After the higher harmonic bands (and fundamental frequency band) are specified, the frequency band masking unit 12 determines the bands whose spectra are to be removed among the higher harmonic bands, i.e., removal bands.

A criterion for determining the removal bands is arbitrary. Therefore, the frequency band masking unit 12 may determine as the removal band, for example, the band at the predetermined number as counted from the band having the lowest (or highest) frequency, among the specified higher harmonic bands. The removal bands may be the bands at the even numbers (or odd numbers) as counted from the band having the lowest (or highest) frequency, among the specified higher harmonic bands. Alternatively, the removal bands may be the consecutive β (β is a positive integer smaller than) bands at every -th (is an integer of 2 or larger) starting from a predetermined number as counted from the band having the lowest (or highest) frequency, among the specified higher harmonic bands.

(6) The frequency band masking unit 12 supplies the signals other than the signals representing the spectrum distributions of the removal bands, among the (n+1) signals supplied from the filter bank 113, to the synthesizer 13.

The frequency band masking unit 12 supplies therefore the synthesizer 13 with the signals representing the spectrum distributions (spectrum distributions after thinning) obtained by removing the spectrum components of the removal bands from the spectrum of the PCM signal to be subjected to frequency thinning.

Figure 4:
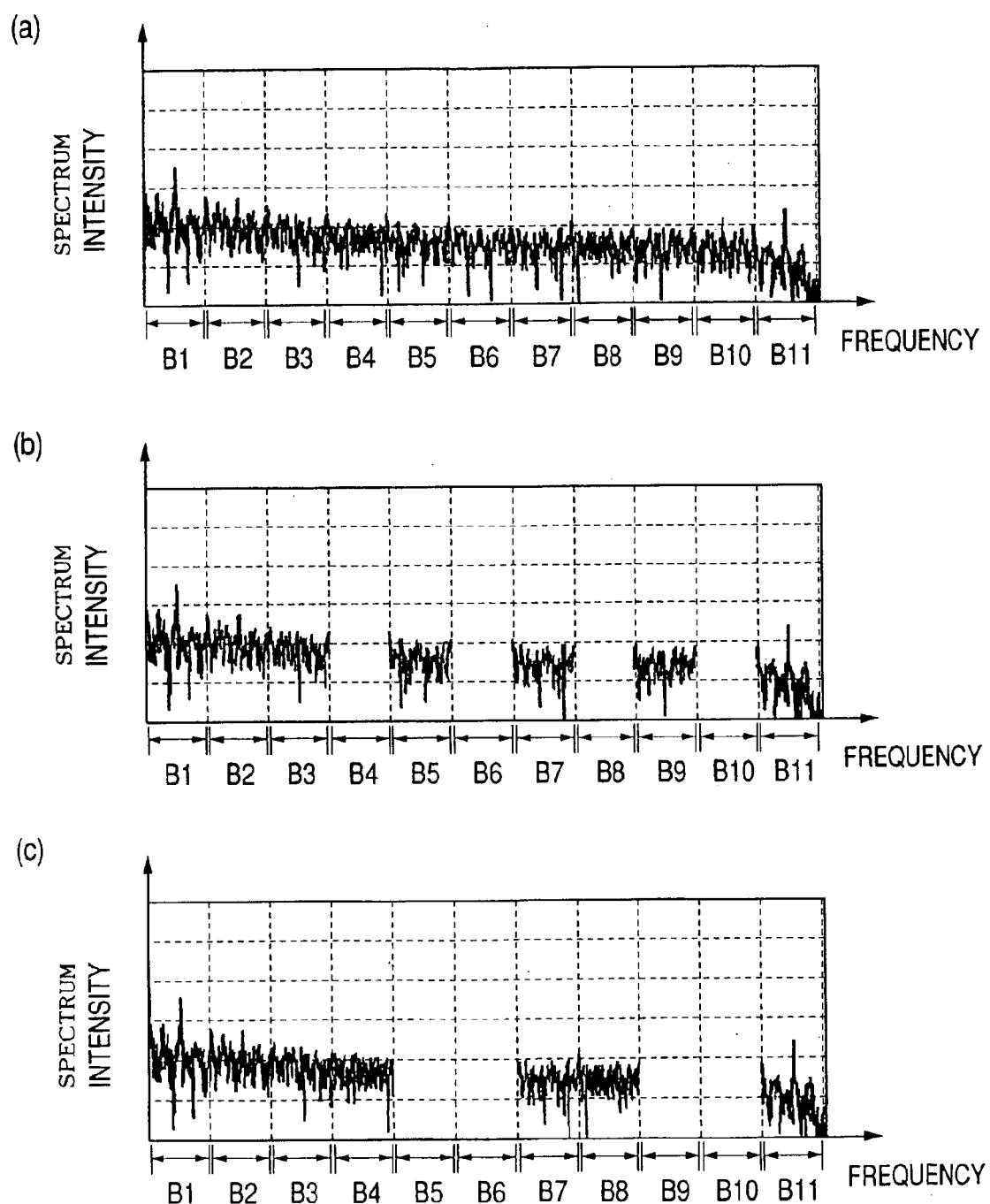
FIG. 4(a) is a diagram showing an example of a spectrum distribution before thinning.
FIGS. 4(b) and 4(c) are diagrams showing examples of a spectrum distribution after thinning.

FIG. 4(a) is a diagram showing an example of a spectrum distribution (spectrum distribution before thinning) of the PCM signal supplied to the analyzer, and FIGS. 4(b) and. 4(c) are diagrams showing examples of a spectrum distribution after thinning obtained through frequency thinning of the PCM signal having the spectrum distribution shown in FIG. 4(a).

FIG. 4(b) shows the spectrum distribution after thinning wherein of eleven bands (bands B1 to B11) of the PCM signal supplied to the analyzer 11, the bands B3 to B11 are specified as the higher harmonic bands, and of the bands specified as the higher harmonic bands, the bands at even numbers as counted from the band having the lowest frequency are determined as the removal bands.

FIG. 4(c) shows the spectrum distribution after thinning wherein of eleven bands (bands B1 to B11) of the PCM signal supplied to the analyzer 11, the bands B3 to B11 are specified as the higher harmonic bands, and of the bands specified as the higher harmonic bands, the two consecutive bands at every fourth starting from a third band as counted from the band having the lowest frequency are determined as the removal bands.

In the spectrum distributions after thinning shown in FIGS. 4(b) and 4(c), the removal bands belong to the higher harmonic hands, Therefore, a spectrum approximate to that of an audio signal before thinning can be obtained through interpolation of the spectrum corresponding to the spectrum distribution of a band other than the removal band (e.g., the band adjacent to the removal band on the low frequency side, occupying the substantially the same band width as that of the removal band).

Figure 5:
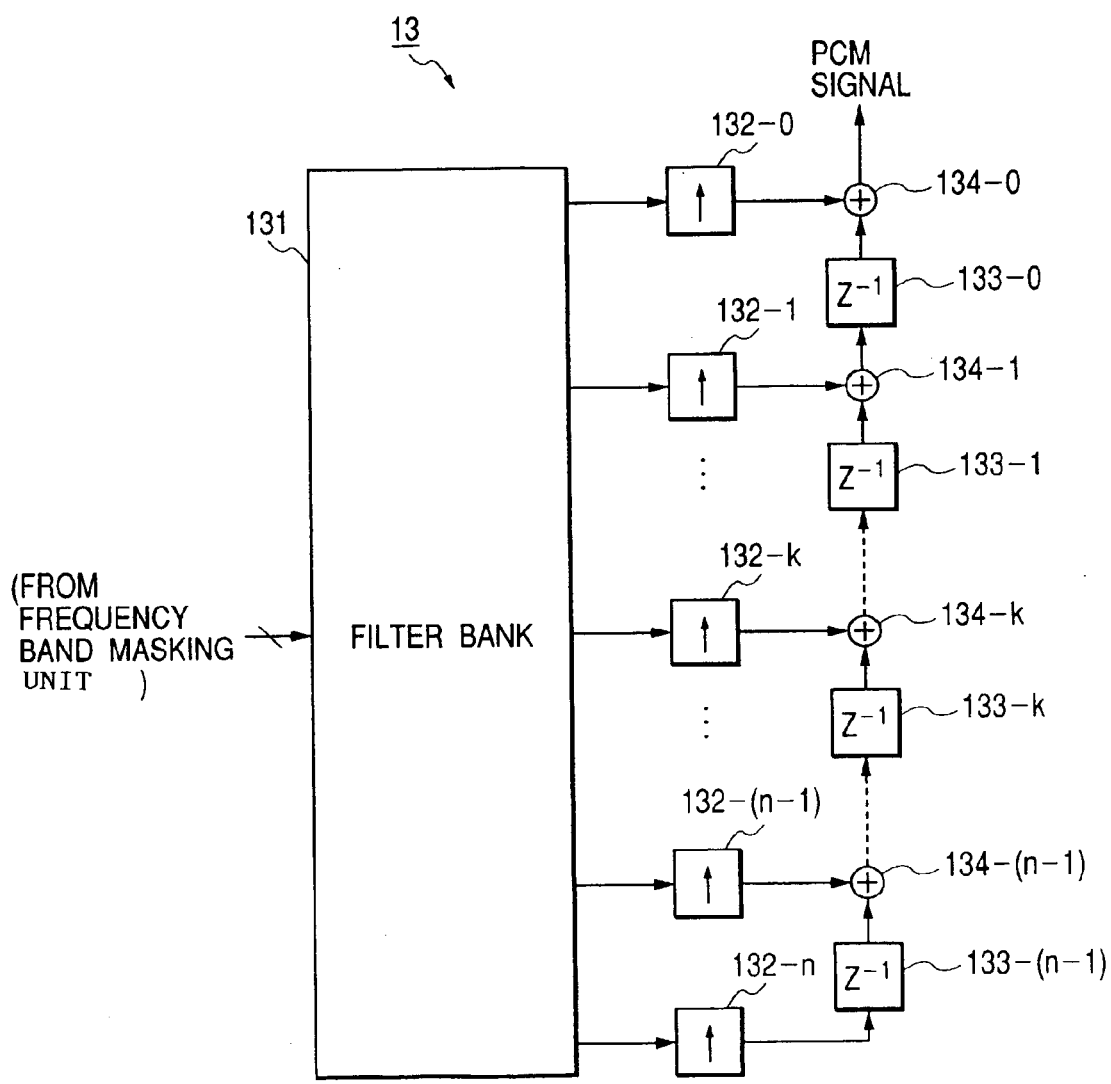
FIG. 5 is a diagram showing the structure of a synthesizer.

As shown in FIG. 5, the synthesizer 13 is constituted of a filter band 131, (n+1) samplers 132-0 to 132-n, n delay units 133-0 to 133-(n−1) and n adders 134-0 to 134-(n−1).

The filter bank 131 is constituted of a DSP, a CPU and the like, and receives the signals representative of spectrum distributions after thinning from the frequency band masking unit 12 as described above. The filter bank 131 generates (n+1) signals representative of values obtained by sampling at (n+1) points at an equal pitch the signals representative of spectrum distributions of input signals, by means of a poly-phase filter, DCT, LOT, MLT, ELT or the like. The filter bank 131 supplies a p-th signal (p is an integer of any one of 1 to (n+1)) among the generated (n+1) signals, to a sampler 132-(p−1).

The sampling period used by the filter bank 131 to generate the (n+1) signals is assumed to be substantially equal to the sampling period used by the samplers 112-0 to 112-n of the analyzer 11.

The p-th signal generated by the filter bank 131 is assumed to be representative of the signal at the p-th earliest sampling time among the signals sampled at the (n+1) points at an equal pitch and representative of the spectrum distributions of the signals supplied to the filter bank 131.

Each of the samplers 132-0 to 132-n converts an input signal into a signal having a frequency of the signal multiplied by (n+1) to output the conversion result as a PCM signal.

The sampler 132-(p−1) is supplied with the p-th signal output from the filter band 131 as described earlier. A sampler 132-(s−1) supplies its output signal to an adder 134-(p−1) (s is an integer of any one of 1 to n). A sampler 132-n supplies its output signal to the delay unit 133-(n−1).

Each of the delay units 133-0 to 133-(n−1) delays its input signal by one period of the signal and outputs it.

An output of a delay unit 133-k (k is an optional integer not smaller than 0 and not larger than (n−1)) is supplied to an adder 134-k. A delay unit 133-j (j is an optional integer not smaller than 0 and not larger than (n−2)) is supplied with an output of an adder 134-(j+1). The delay unit 133-(i n−1) is supplied with an output of the sampler 132-n as described earlier.

Each of the adders 134-0 to 134-(n−1) outputs a signal which is a sum of two input signals.

The adder 134-k is supplied with two signals from the sampler 132-k and delay unit 133-k. An output signal of an adder 134-m (m is an integer not smaller than 1 and not larger than (n−1)) is supplied to a delay unit 133-(m−1). An output signal of the adder 134-0 is supplied to the audio signal compressing unit 2 as an output of the frequency thinning unit 1.

The output signal of the adder 134-0 corresponds to the signals output from the samplers 132-0, 132-1, ... , 132-(n−1) sequentially output at the period substantially equal to that of the PCM signal supplied to the analyzer 11, and is the PCM signal having the spectrum distribution corresponding to that after thinning.

The audio signal compressing unit 2 is constituted of a DSP, a CPU and the like as well as a storage medium drive for writing data in and reading data from a recording medium (e.g., CD-R). When an output signal of the frequency thinning unit 1 is supplied, the audio signal compressing unit 2 compresses the supplied signal by MP3, AAC (Advanced Audio Coding) or the like. The compressed signal data is written in an external storage medium set in the recording medium drive.

The audio signal compressing unit 2 may have a communication control unit constituted of a modem, terminal adapter and the like connected to an external communication line, instead of the storage medium or together with the storage medium. In this case, the audio signal compressing unit 2 may transmit the compressed data of the output signal of the frequency thinning unit 1 to an external via a communication line.

The audio signal expanding unit 3 is constituted of a DSP, a CPU and the like as well as a storage medium drive. The audio signal expanding unit 3 reads the PCM signal compressed by MP3, MC or the like from an external storage medium set in the storage medium drive. The audio signal expanding unit 3 expands the read data by MP3, MC or the like to generate the PCM signal representative of the expanded data and supply it to the frequency interpolating unit 4.

The audio signal expanding unit 3 may have a communication control unit instead of the storage medium drive or together with the storage medium. In this case, the audio signal expanding unit 3 may receive the PCM signal compressed by MP3, MC or the like from an external via a communication line, and expands the compressed PCM signal to supply the PCM signal obtained through expansion to the frequency interpolating unit 4.

Figure 6:
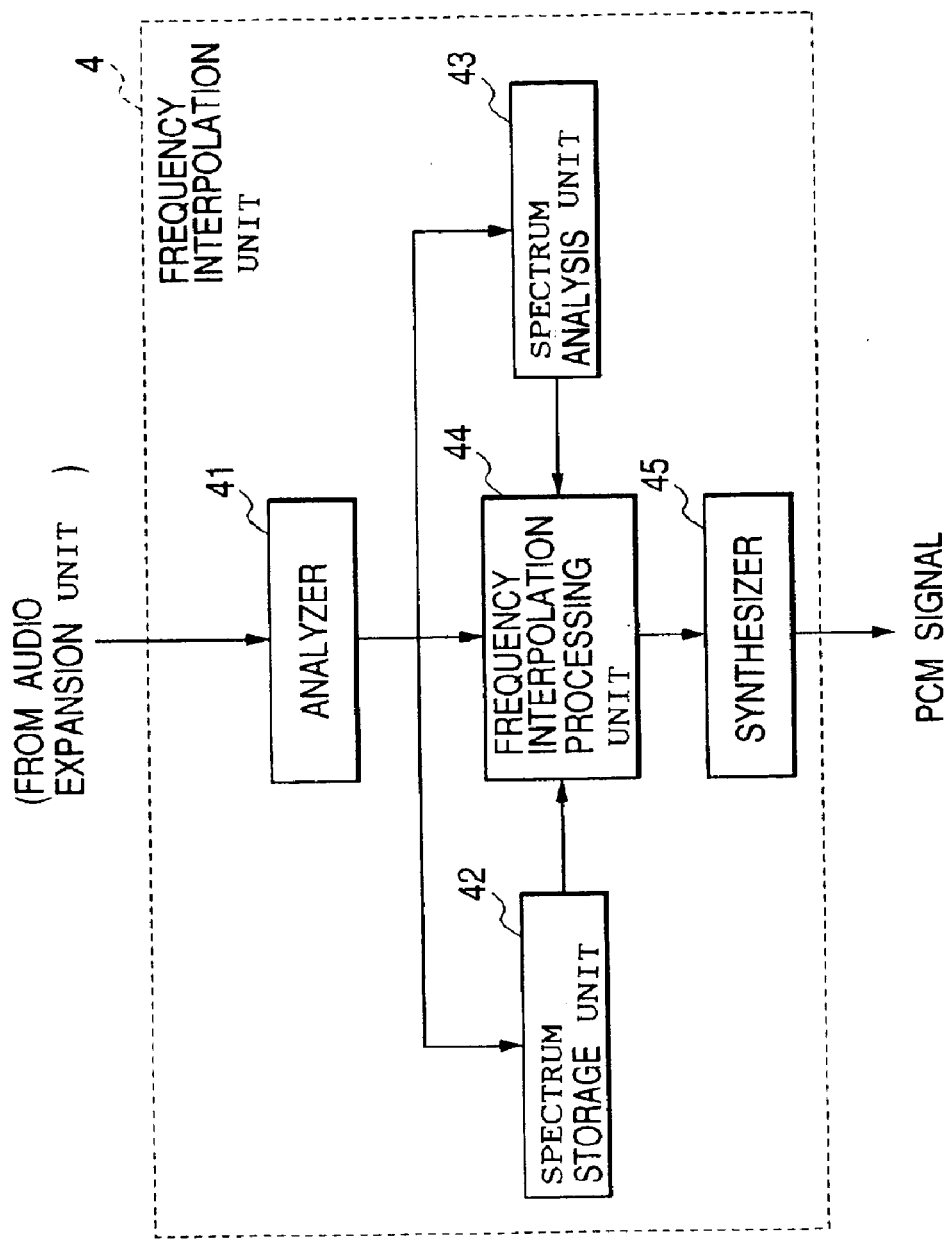
FIG. 6 is a diagram showing the structure of a frequency interpolation unit.

As shown in FIG. 6, the frequency interpolating unit 4 is constituted of an analyzer 41, a spectrum storage unit 42, a spectrum analyzer 43, a frequency interpolation processing unit 44 and a synthesizer 45.

Of these components, the analyzer 41 has substantially the same structure as that of the analyzer 11 of the frequency thinning unit 1, and the synthesizer 45 has substantially the same structure as that of the synthesizer 13 of the frequency thinning unit 1.

The analyzer 41 generates first to (n+1)-th (n+1) signals representative of the spectrum distribution of the PCM signal supplied from the audio signal expanding unit 3 to be subjected to frequency interpolation. The analyzer 41 supplies the generated (n+1) signals to the spectrum storage unit 42, spectrum analyzer 43 and frequency interpolation processing unit 44.

A p-th signal (p is an integer of any one of 1 to (n+1)) generated by the analyzer 41 is assumed to be a signal representative of the spectrum distribution of the band at the p-th lowest frequency among the bands having the same band width and obtained by equally dividing by (n+1) the spectrum distribution of the PCM signal supplied from the audio signal expanding unit 3 (i.e., PCM signal to be subjected to frequency interpolation).

The spectrum storage unit 42 may be a RAM (Random Access Memory) or the like and stores the (n+1) signals supplied from the analyzer 41. In response to an instruction from the frequency interpolation processing unit 44, the spectrum storage unit 42 supplies stored signals to the frequency interpolation processing unit 44.

The spectrum analyzer 43 is constituted of a DSP, a CPU and the like. Upon reception of the (n+1) signals representative of the spectrum distributions of the (n+1) bands supplied from the analyzer 41, the spectrum analyzer 43 specifies the bands (i.e., removal bands) not substantially containing spectra among the bands represented by the signals supplied from the analyzer 41. The spectrum analyzer 43 selects the bands (interpolation bands) for interpolation of the specified removal bands from the bands other than the removal bands among the bands represented by the signals supplied from the analyzer 41, and notifies the selection result to the frequency interpolation processing unit 44.

Figure 7:
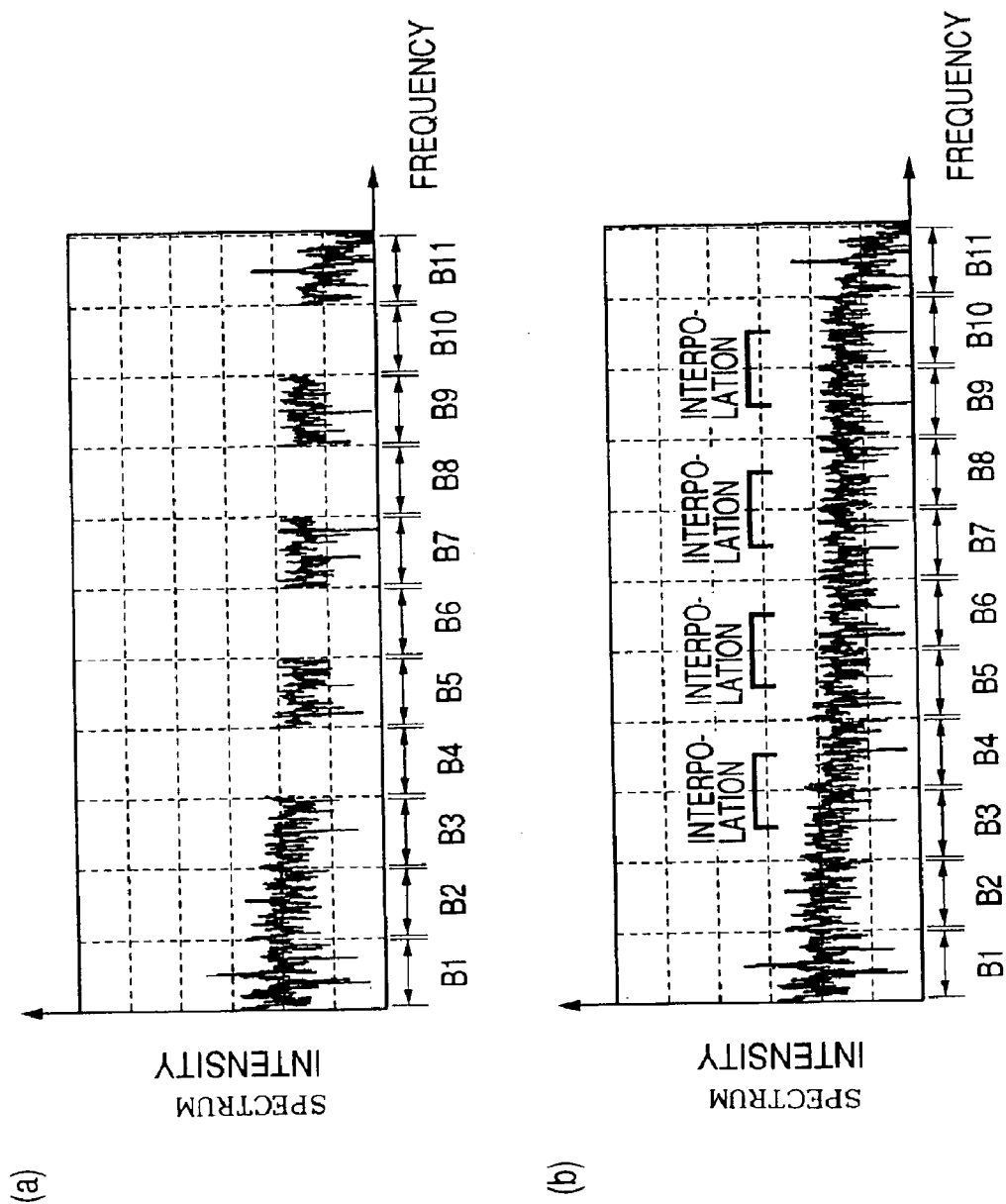
FIG. 7(a) is a diagram showing an example of a spectrum distribution before interpolation.
FIG. 7(b) is a diagram showing an example of a spectrum distribution after interpolation.
Figure 8:
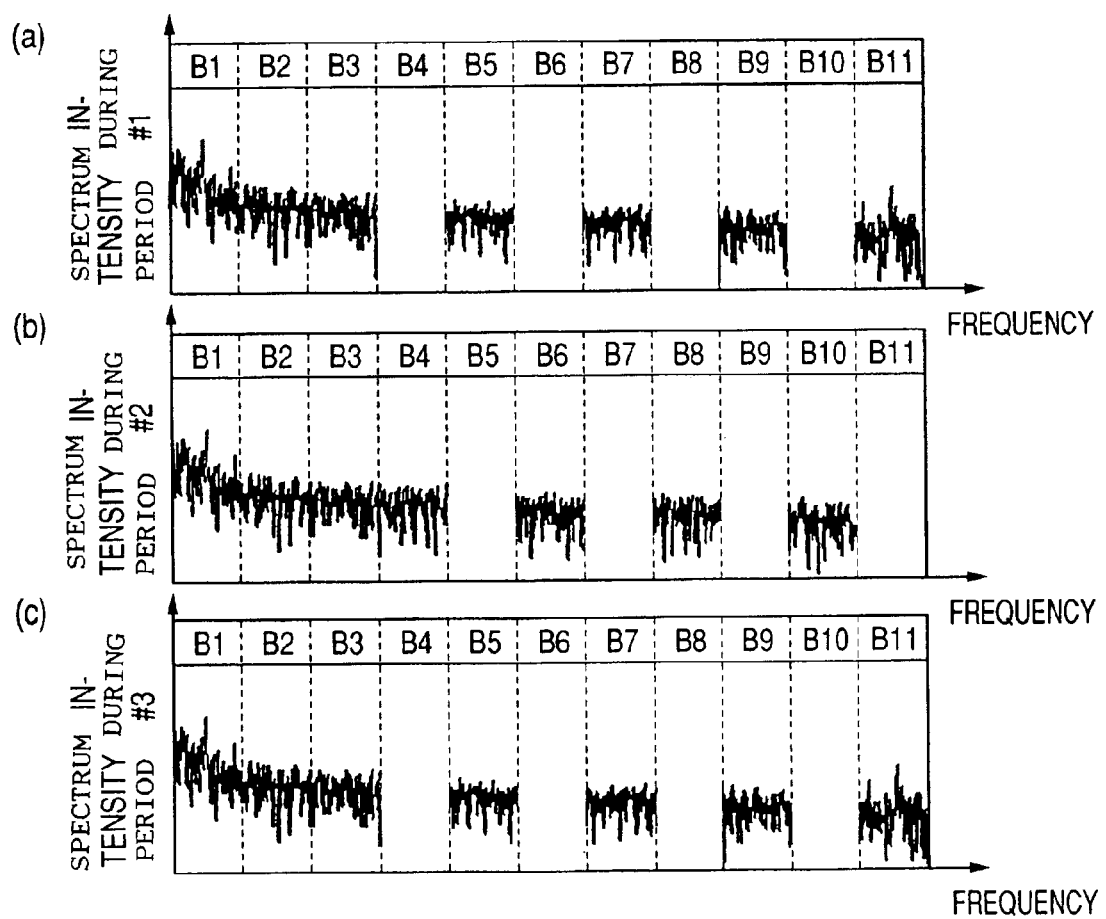
FIG. 8 is a diagram showing spectra of a PCM signal whose range of removal bands changes with time.

A criterion for determining an interpolation band is arbitrary. For example, if there is a band other than the removal band near the specified removal band on the low frequency side, then as shown in FIG. 7 the spectrum analyzer 43 may determine this band near the specified removal band on the low frequency side as the interpolation band.

The frequency interpolation processing unit 44 is constituted of a DSP, a CPU and the like. When the frequency interpolation processing unit 44 receives the (n+1) signals representative of the spectrum distributions of the (n+1) bands from the analyzer 41, it specifies an envelope function of the spectrum distribution of each band. When the selection result of the interpolation band is notified from the spectrum analyzer 43, the frequency interpolation processing unit 44 obtains the spectrum distribution of signal components to be interpolated for the removal band by scaling the interpolation band indicated by the selection result in accordance with the envelope function.

Specifically, for example, the frequency interpolation processing unit 44 calculates a mean square value of the spectrum components of the interpolation band indicated by the selection result notified by the spectrum analyzer 43, and also estimates the mean squared value of the spectrum components of the removal band in accordance with the envelope function which was specified by the frequency interpolation processing unit 44 itself. A ratio is then calculated between the mean square value of the spectrum components of the removal band and the estimated mean square value of the spectrum components of the removal band. Each spectrum component value of the interpolation band is multiplied by this ratio to obtain its product. A set of these products represents the spectrum distribution of signal components to be interpolated for the removal band.

The frequency interpolation processing unit 44 regards the spectrum distribution of signal components to be interpolated for the removal band as the spectrum distribution of the removal band after interpolation to thereby generate a signal representative of the spectrum distribution of the removal band after interpolation. The generated signal is supplied to the synthesizer 45.

This signal supplied from the frequency interpolation processing unit 44 to the synthesizer 45 represents the spectrum distribution (spectrum distribution after interpolation) obtained by adding the spectrum of the PCM signal supplied from the audio signal expanding unit 3 to the frequency interpolation unit 4 to the spectrum components of the removal band after interpolation.

If the frequency interpolation processing unit 44 regards the spectrum distribution of signal components to be interpolated for the removal band as the spectrum distribution of the removal band after interpolation, it is assumed that the frequency of the spectrum of the interpolation band after scaling is an original frequency added to an absolute value of a difference between the lowest frequencies of the removal and interpolation bands.

Upon reception of the signal representative of the spectrum distribution after interpolation and output from the frequency interpolation processing unit 44, the synthesizer 45 outputs a PCM signal having the spectrum distribution corresponding to the spectrum distribution after interpolation. In other words, the PCM signal output from the synthesizer 45 corresponds to the PCM signal obtained by sampling at (n+1) points at an equal pitch the signal having the spectrum distribution after interpolation and sequentially outputting them at the period substantially equal to the period of the PCM signal supplied to the analyzer 41.

FIG. 7(a) is a diagram showing an example of a spectrum distribution (spectrum distribution before interpolation) of the PCM signal supplied to the analyzer 41 from the audio signal expanding unit 3, and FIG. 7(b) is a diagram showing an example of a spectrum distribution after interpolation obtained through frequency interpolation of the PCM signal having the spectrum distribution shown in FIG. 7(a).

As shown in FIG. 7(a), of the eleven bands (bands B1 to B11) of the PCM signal supplied to the analyzer 41 from the audio signal expanding unit 3, the bands B4, B6, B8 and B10 are the removal bands. In this case, if the bands near the removal bands on the low frequency side are used as the interpolation bands, the spectrum distribution after interpolation is, as shown in FIG. 7(b), the spectrum distribution obtained by adding the spectra having the distributions substantially the same as those of the bands B3, B5, B7 and B9 to the removal bands B4, B6, B8 and B10.

By performing the interpolation shown in FIG. 7(b), the spectrum approximate to that of the PCM signal before frequency interpolation can be obtained. When an audio signal is recovered by using the PCM signal output from the synthesizer 45, the audio signal of high quality can therefore be recovered. In particular, if the bands B3 to B11 do not contain the fundamental frequency components of the PCM signal before frequency thinning, the spectrum distribution after interpolation becomes approximate to the spectrum distribution of the PCM signal before frequency thinning.

The structure of the audio signal processing apparatus is not limited only to that described above.

For example, the audio signal processing apparatus is not necessarily required to have the audio signal compressing unit 2 and audio signal expanding unit 3. The signal to be subjected to frequency thinning by the frequency thinning unit 1 and the signal to be subjected to frequency interpolation by the frequency interpolating unit 4 are neither necessary to be a PCM signal nor necessary to be a signal obtained through modulation of an audio signal.

DSP and CPU may realize the functions of the delay units 111-0 to 111-(n−1) and 133-0 to 133-(n−1), samplers 112-0 to 112-n and 132-0 to 132-n and adders 134-0 to 134-(n−1).

In determining the higher harmonic bands (and fundamental frequency bands), instead of the correlation coefficient the frequency band masking unit 12 may obtain an arbitrary numeric value representative of correlation between spectra of two bands in accordance with the spectrum distributions of the two bands.

The range of removal bands contained in an output signal (PCM signal) of the frequency thinning unit 1 may change with time. Therefore, for example, as shown in FIGS. 8(a) to 8(c) and FIG. 9(a), a signal output from the frequency thinning unit 1 may be a signal alternately repeating the state that the removal bands are the bands B4, B6, B8 and B10 and the state that the removal bands are the bands B5, B7, B9 and B11, at a constant time interval in the order of periods #1, #2, #3, . . . .

Figure 9:
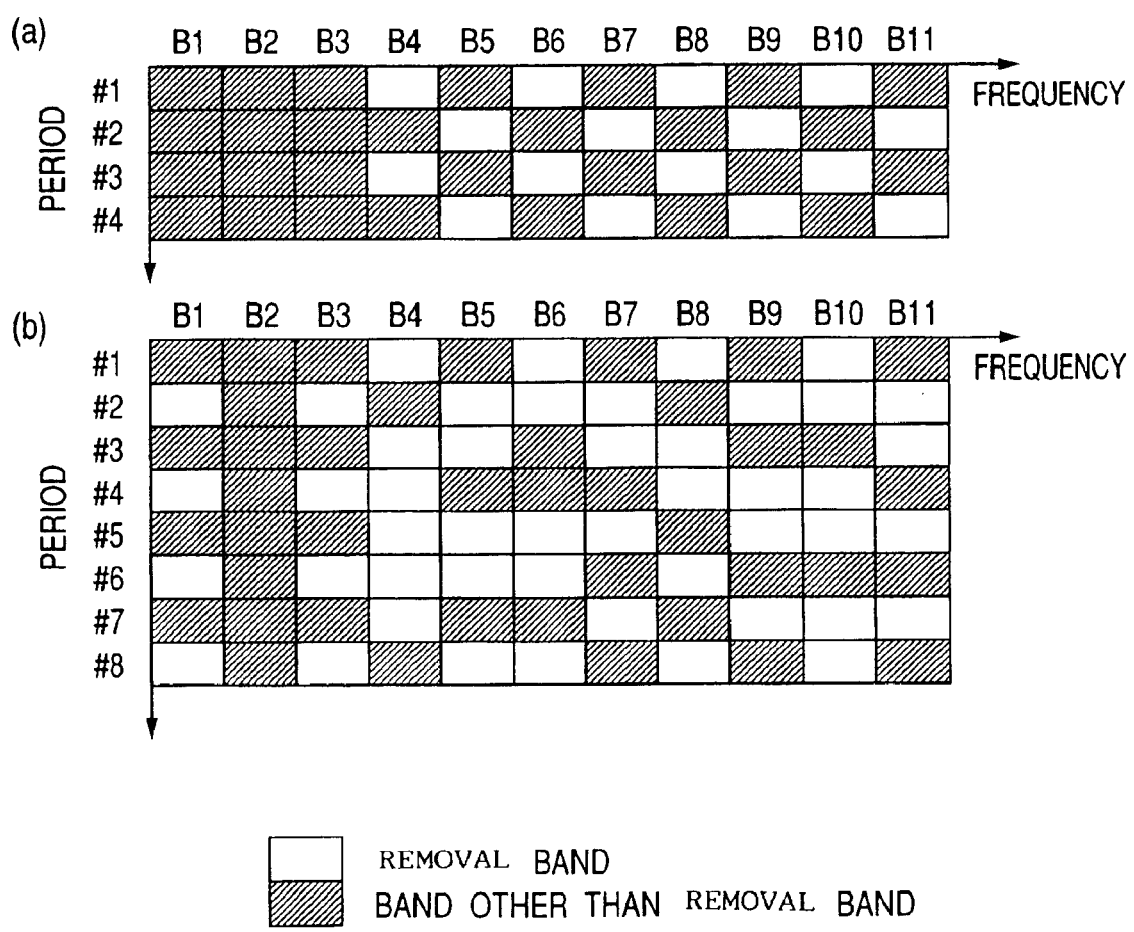
FIG. 9 is a diagram how the range of removal bands changes with time.

The range of removal bands may change at random. Therefore, for example, as shown in FIG. 9(b), the range of removal bands may change in the specific periods #1 to #8.

Similarly, the range of removal bands contained in a PCM signal supplied from the frequency interpolating unit 4 may change with time. Therefore, for example, as shown in FIGS. 8(a) to 8(c) and FIG. 9(a), a signal supplied to the frequency interpolation unit 4 may be a signal alternately repeating the state that the removal bands are the bands B4, B6, B8 and B10 and the state that the removal bands are the bands B5, B7, B9 and B11, at a constant time interval in the order of periods #1, #2, #3, . . . .

The range of removal bands contained in a PCM signal and supplied to the frequency interpolating unit 4 may change at random. Therefore, for example, as shown in FIG. 9(b), the range of removal bands contained in the PCM signal and supplied to the frequency interpolation unit 4 may change in the specific periods #1 to #8.

The spectrum analyzer 43 may select an interpolation band from the past spectra of PCM signals supplied to the frequency interpolating unit 4. Specifically, for example, if the range of removal bands changes as shown in FIGS. 8(a) to 8(c) and FIG. 9(a), the bands B5, B7, B9 and B11 in the period #1 may be selected as the interpolation bands for the removal bands B5, B7, B9 and B11 in the period #2, and the bands B4, B6, B8 and B10 in the period #2 may be selected as the interpolation bands for the removal bands B4, B6, B8 and B10 in the period #3.

Figure 10:
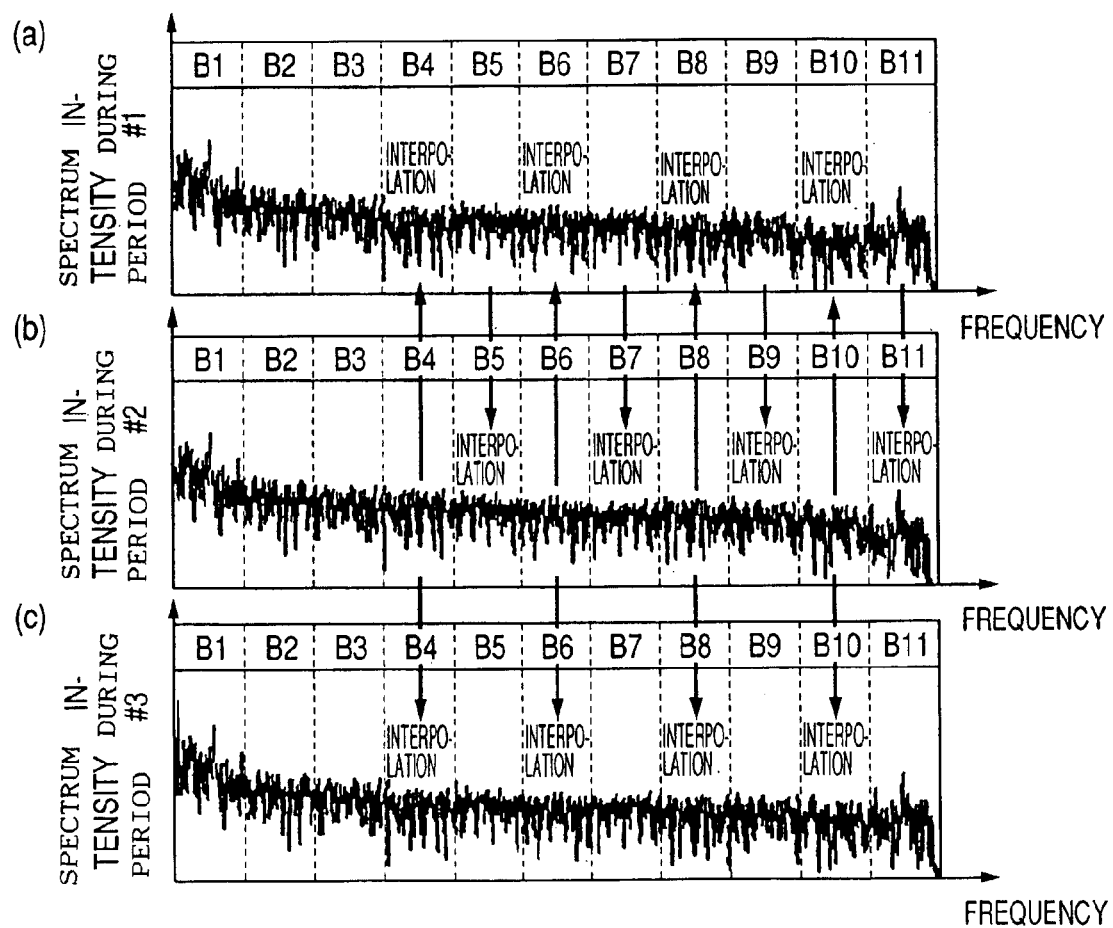
FIG. 10 is a diagram how a PCM signal whose range of removal bands changes with time is subjected to frequency interpolation.

As the result of the selection of interpolation bands in the above manner, as shown in FIGS. 10(a) to 10(c), the removal bands B5, B7, B9 and B11 in the period #2 are interpolated by using the spectra of the bands B5, B7, B9 and B11 in the period #1, and the removal bands B4, B6, B8 and B10 in the period #3 are interpolated by using the spectra of the bands B4, B6, B8 and B10 in the period #2.

If the range of removal bands changes at random, as the interpolation band for interpolating the removal band in each period, the band in the same removal band section in any past period may be selected which is not the removal band.

If the spectrum analyzer 43 selects the interpolation band from past spectra of PCM signals supplied to the frequency interpolating unit 4, the frequency interpolation processing unit 44 reads information representative of the spectrum distribution of the interpolation band from the spectrum storage unit 42 to use it for the interpolation of the removal band.

In this case, it is desired that the spectrum storage unit 42 has a large storage capacity sufficient for reliably storing the spectrum of the interpolation band selected by the spectrum analyzer 43.

The spectrum analyzer 43 may select the interpolation band from future spectra of PCM signals to be supplied to the frequency interpolating unit 4. Specifically, for example, if the range of removal bands changes as shown in FIGS. 8(a) to 8(c) and FIG. 9(a), as the interpolation bands for the interpolation of the removal bands B4, B6, B8 and B10 in the period #1, the bands B4, B6, B8 and B10 in the period #2 may be selected.

If the interpolation bands are selected in such a manner, for example, the frequency interpolation processing unit 44 reads the signal representative of a spectrum in the period #1 from the spectrum storage unit 42 when the spectrum representative of a spectrum in the period #2 is supplied from the analyzer 41.

The read signal is interpolated by using the signal representative of the spectrum in the period #2 supplied from the analyzer 41. As a result, as shown in FIGS. 10(a) and 10(b), the removal bands B4, B6, B8 and B10 in the period #1 are interpolated by using the spectra of the bands B4, B6, B8 and B10 in the period #2.

For example, if the range of removal bands changes at random, as the interpolation band for the interpolation of the removal band in each period, the spectrum analyzer 43 may select the band in the same removal band section in any future period may be selected which is not the removal band.

The embodiments of the invention have been described above. The frequency interpolating device of the invention may be realized not only by a dedicated system but also by a general computer system.

For example, the frequency interpolating unit 4 for realizing the operations of the analyzer 41, spectrum storage unit 42, spectrum analyzer 43, frequency interpolating unit 44 and synthesizer 45 can be realized by installing a program realizing the functions of the frequency interpolating unit 4 and stored in a medium (CD-ROM, MO, floppy disk or the like) in a personal computer or a microcomputer.

For example, the program may be written in a bulletin board system on a communication line to distribute the program. A carrier may be modulated by a signal representative of the program and an obtained modulated signal is transmitted. An apparatus received this modulated signal demodulates it to recover the program.

This program is run under the control of OS in a manner similar to other application programs to thereby execute the above-described processes.

If OS shares part of the processes or constitutes part of one constituent element of the invention, the program excluding such part may be stored in a storage medium. Also in this case, in the present invention, the program for realizing various functions or steps to be executed by a computer is stored in the storage medium.

Industrial Applicability

As described so far, according to the present invention, a frequency interpolating device and method is realized which can restore an audio signal or the like compressed at a high ratio by removing the frequency components in a specific frequency band, while the quality of the signal is maintained high.

What is claimed is:

1. A frequency interpolating device for restoring an approximate original signal from a signal having information compressed by removing frequency components of an original signal in a particular frequency band and in a particular period, wherein:

a removal band in one signal period of the signal having the compressed information from which the particular frequency components were removed is inserted with frequency components left in a frequency band same as the removal band and in another signal period different from the one signal period of the signal having the compressed information, thereby interpolating the frequency components of the removal band.

2. The frequency interpolating device according to claim 1, wherein the different signal period is a signal period adjacent to the certain signal period.

3. The frequency interpolating device according to claim 1, wherein the different signal period is a signal period immediately before the certain signal period.

4. A frequency interpolating device, comprising:

means for generating spectrum signals representative of spectra in first and second periods of an input signal to be interpolated;

means for generating envelope information representative of an envelope of the spectrum during the first period in accordance with the spectrum signal;

means for discriminating a spectrum removal band in the first period in which a spectrum does not substantially exist, in accordance with the spectrum signal;

means for identifying a spectrum pattern in a frequency band substantially identical with the spectrum removal band in the second period, in accordance with the spectrum signal; and means for adding to the input signal a signal having the spectrum pattern in the frequency band substantially identical with spectrum removal band in the second period and having a spectrum intensity equal to an intensity estimated by the envelope represented by the envelope information in the removal band.

5. The frequency interpolating device according to claim 4, wherein the input signal is a digital signal obtained by sampling and quantizing an analog signal.

6. A frequency interpolating method of restoring an approximate original signal from a signal having information compressed by removing frequency components of an original signal in a particular frequency band and in a particular period, wherein:

a removal band in one signal period of the signal having the compressed information from which the particular frequency components were removed is inserted with frequency components left in a frequency band same as the removal band and in another signal period different from the one signal period of the signal having the compressed information, thereby interpolating the frequency components of the removal band.

7. A frequency interpolating method, comprising the steps of:

generating spectrum signals representative of spectra in first and second periods of an input signal to be interpolated;

generating envelope information representative of an envelope of the spectrum during the first period in accordance with the spectrum signal;

discriminating a spectrum removal band in the first period in which a spectrum does not substantially exist, in accordance with the spectrum signal;

identifying a spectrum pattern in a frequency band substantially identical with the spectrum removal band in the second period, in accordance with the spectrum signal; and adding to the input signal a signal having the spectrum pattern in the frequency band substantially identical with spectrum removal band in the second period and having a spectrum intensity equal to an intensity estimated by the envelope represented by the envelope information in the removal band.

8. A computer readable storage medium storing a program for making a computer realize functions of:

means for generating spectrum signals representative of spectra in first and second periods of an input signal to be interpolated;

means for generating envelope information representative of an envelope of the spectrum during the first period in accordance with the spectrum signal;

means for discriminating a spectrum removal band in the first period in which a spectrum does not substantially exist, in accordance with the spectrum signal;

means for identifying a spectrum pattern in a frequency band substantially identical with the spectrum removal band in the second period, in accordance with the spectrum signal; and means for adding to the input signal a signal having the spectrum pattern in the frequency band substantially identical with the spectrum removal band in the second period and having a spectrum intensity equal to an intensity estimated by the envelope represented by the envelope information in the removal band.

* * * * *